United States Patent
Goesnar

(10) Patent No.: US 10,104,338 B2
(45) Date of Patent: Oct. 16, 2018

(54) AUTOMATIC VIDEO FRAMING OF CONFERENCE PARTICIPANTS

(71) Applicant: Dolby Laboratories Licensing Corporation, San Francisco, CA (US)

(72) Inventor: Erwin Goesnar, Daly City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/681,923

(22) Filed: Aug. 21, 2017

(65) Prior Publication Data

US 2018/0063482 A1    Mar. 1, 2018

Related U.S. Application Data

(60) Provisional application No. 62/438,383, filed on Dec. 22, 2016, provisional application No. 62/379,363, filed on Aug. 25, 2016.

(51) Int. Cl.
*H04N 7/15* (2006.01)
*H04N 5/72* (2006.01)
*H04N 5/225* (2006.01)

(52) U.S. Cl.
CPC ............ *H04N 7/15* (2013.01); *H04N 5/2259* (2013.01); *H04N 5/72* (2013.01)

(58) Field of Classification Search
None
See application file for complete search history.

(56) References Cited

U.S. PATENT DOCUMENTS

| 8,150,155 B2 | 4/2012 | El-Maleh |
| 8,169,463 B2 | 5/2012 | Enstad |
| 8,265,349 B2 | 9/2012 | Wang |
| 8,456,503 B2 | 6/2013 | Hoelsaeter |
| 8,488,840 B2 * | 7/2013 | Fukumoto .......... G06K 9/00228 382/103 |
| 8,531,557 B2 | 9/2013 | Wan |
| 8,605,945 B2 | 12/2013 | El-Maleh |

(Continued)

OTHER PUBLICATIONS

Kannala, J. et al "A Generic Camera Model and Calibration Method for Conventional, Wide-Angle, and Fish-Eye Lenses" IEEE Transactions on Pattern Analysis and Machine Intelligence, pp. 1335-1340, vol. 28, Issue 8, Jun. 19, 2006.

(Continued)

*Primary Examiner* — Creighton Smith

(57) ABSTRACT

Systems and methods are described for automatically framing participants in a video conference using a single camera of a video conferencing system. A camera of a video conferencing system may capture video images of a conference room. A processor of the video conferencing system may identify a potential region of interest within a video image of the captured video images, the potential region of interest including an identified participant. Feature detection may be executed on the potential region of interest, and a region of interest may be computed based on the executed feature detection. The processor may then automatically frame the identified participant within the computed region of interest, the automatic framing including at least one of cropping the video image to match the computed region of interest and rescaling the video image to a desired resolution.

20 Claims, 7 Drawing Sheets

(56) References Cited

U.S. PATENT DOCUMENTS

| | | | |
|---|---|---|---|
| 8,773,498 B2 | 7/2014 | Lindbergh | |
| 8,982,180 B2 | 3/2015 | Corcoran | |
| 9,098,737 B2 | 8/2015 | Sanaullah | |
| 9,294,726 B2 | 3/2016 | Decker | |
| 9,307,200 B2 | 4/2016 | Aarrestad | |
| 2010/0238262 A1 | 9/2010 | Kurtz | |
| 2014/0240500 A1* | 8/2014 | Davies | H04N 7/183 348/148 |
| 2015/0296178 A1 | 10/2015 | Aarrestad | |
| 2016/0007047 A1 | 1/2016 | Hosseini | |
| 2016/0277712 A1* | 9/2016 | Michot | H04N 7/142 |
| 2018/0017757 A1* | 1/2018 | Bohn | G02B 3/12 |

OTHER PUBLICATIONS

Wang, B. et al "A Fast Self-Tuning Background Subtraction Algorithm" IEEE Conference on Computer Vision and Pattern Recognition Workshops, Jun. 23-28, 2014, pp.

Zivkovic, Zoran "Improved Adaptive Gaussian Mixture Model for Background Subtraction" International Conference Pattern Recognition, vol. 2, pp. 28-31, 2004.

Suzuki, S. et al "Topological Structural Analysis of Digitized Binary Images by Border Following" vol. 30, Issue 1, Apr. 1985, pp. 32-46.

Patil, R. et al "People Detection and Tracking in High Resolution Panoramic Video Mosaic" Proc. of IEEE International Conference on Intelligent Robots and Systems, Sep. 28-Oct. 2, 2004, vol. 2, pp. 1323-1328.

Bobick, A. et al "The Recognition of Human Movement Using Temporal Templates" IEEE Transactions on Pattern Analysis and Machine Intelligence, vol. 23, No. 3, Mar. 1, 2001, pp. 257-267.

Zhang, C. et al "Semantic Saliency Driven Camera Control for Personal Remote Collaboration" IEEE 10th Workshop on Multimedia Signal Processing, Oct. 8, 2008, pp. 28-33.

\* cited by examiner

AUTOMATIC VIDEO FRAMING OF CONFERENCE PARTICIPANTS

CROSS-REFERENCE TO RELATED APPLICATIONS

This application claims the benefit of priority to U.S. Provisional Application No. 62/379,363, filed on Aug. 25, 2016, and U.S. Provisional Application No. 62/438,383, filed on Dec. 22, 2016, both of which are incorporated herein by reference in their entirety.

TECHNICAL FIELD

Embodiments herein relate generally to video capture processing, and more specifically to framing participants in a video teleconferencing system without user intervention.

SUMMARY OF THE INVENTION

Systems and methods are described for automatically framing participants in a video conference using a single camera of a video conferencing system. A camera of a video conferencing system may capture video images of a conference room. A processor of the video conferencing system may identify a potential region of interest within a video image of the captured video images, the potential region of interest including an identified participant. Feature detection may be executed on the potential region of interest, and a region of interest may be computed based on the executed feature detection. The processor may then automatically frame the identified participant within the computed region of interest, the automatic framing including at least one of cropping the video image to match the computed region of interest and rescaling the video image to a desired resolution.

Another embodiment of the present invention describes a video conferencing system. The video conferencing system may include a single camera and an audio controller communicatively coupled to the camera. The single camera may capture video images of a room in which the video conferencing system is broadcasting and receiving video conference data from. The audio controller may include a processor configured to identify a potential region of interest within a video image of the captured video images, the potential region of interest including an identified participant. The processor may also be configured to execute feature detection on the potential region of interest and compute a region of interest based on the executed feature detection. The processor may then automatically frame the identified participant within the computed region of interest, the automatic framing including at least one of cropping the video image to match the computed region of interest and rescaling the video image to a desired resolution.

In addition to the foregoing, embodiments are described for updating the computed region of interest when the identified participant moves in subsequent video images captured by the camera. For example, when a target region of interest that includes the identified participant is not a subset of the computed region of interest, or when the target region of interest is within at least one of a predetermined height and a predetermined width from an edge of the computed region of interest, an update may be applied. The updating may be performed by, for example, setting a timer for updating the computed region of interest, and, when the timer expires, modifying the computed region of interest based on the target region of interest.

BRIEF DESCRIPTION OF THE FIGURES

This disclosure is illustrated by way of example and not limitation in the figures of the accompanying drawings, in which like references indicate similar elements, and in which.

DETAILED DESCRIPTION

Conventional video conferencing systems may provide a camera tracking feature to automatically frame the active participant in a video conference. Such systems generally use two cameras and an independent processing unit to track the participant and provide the framing. In conventional systems, one camera frames an active speaker, and the system may switch back to a full view of the conference room during silent periods. A dedicated set top box may be used to provide this framing feature, and hence the cost of the system may be fairly high.

A method is described to automatically frame the meeting participants that allows the participants of a video conference to join a meeting without having to manually adjust the camera to ensure all of the participants are seen by the remote participants. By taking advantage of a single high-resolution stationary camera using a fish-eye lens, the computational requirement of the proposed method may be much lower than conventional automatic framing solutions.

The proposed approach may use a single high resolution camera with a wide angle lens to better capture the room, and a video analytic to track the meeting participants and automatically pick the region of interest (i.e., to digitally pan, tilt, and zoom) to focus on the meeting participants. In addition, the proposed video analytic method may be computationally much more efficient than conventional video analytics for face tracking. This efficiency may be achieved by exploiting the fact that the field of view of the video capture is wide, and the camera is stationary during usage. This approach reduces the compute requirement by, in some embodiments, only requiring an integrated graphics processing unit (GPU) on a system-on-a-chip (SOC) to perform the necessary computations. Accordingly, a video conferencing system using the described solutions may cost less than using a discrete GPU or additional central processing unit (CPU) or field-programmable gate array (FPGA), as is necessary in conventional automatic framing solutions.

Figure 1:
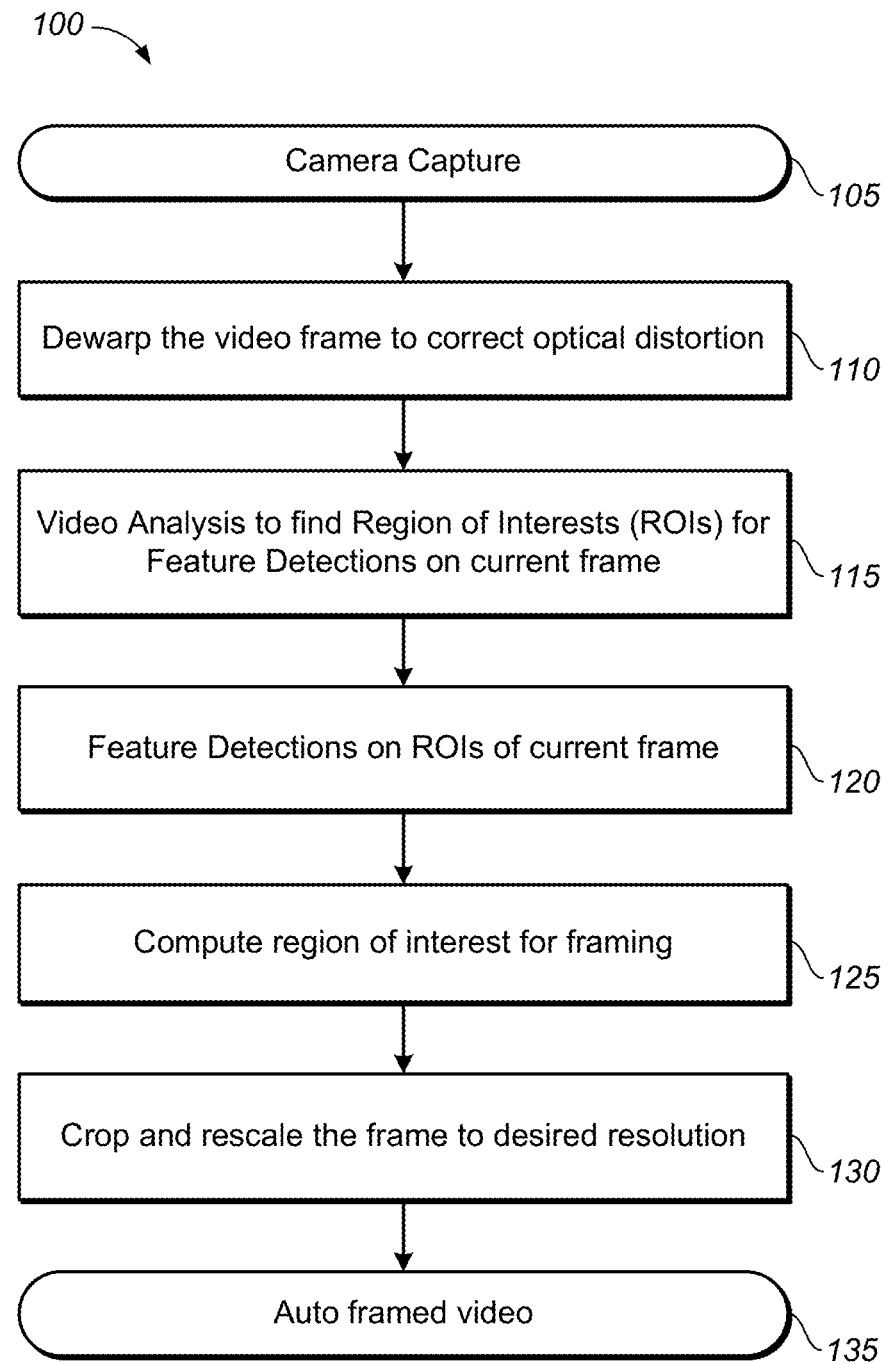
FIG. 1 shows a flow diagram for a method of automatically framing participants in a video conference, in an embodiment.
Figure 2A:
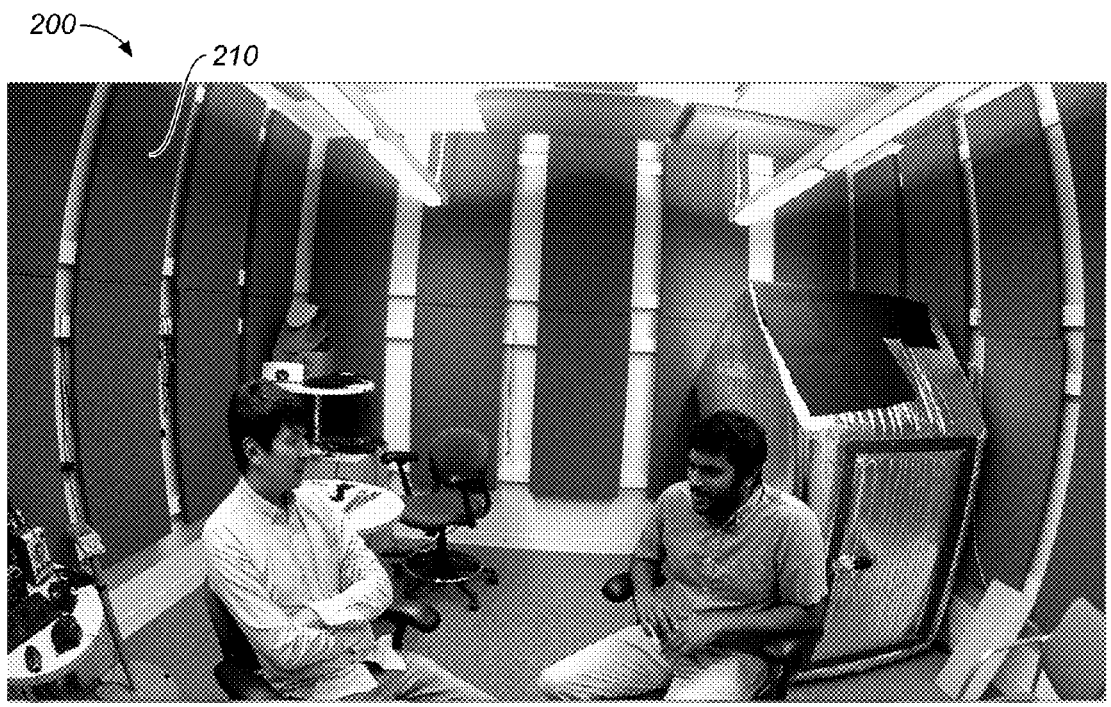
FIGS. 2A-D show photographs of a conference room in a video conference that illustrates various steps of a process that automatically frames participants in the conference room, in an embodiment.

FIG. 1 shows a flow diagram for a method 100 of automatically framing participants in a video conference, in an embodiment. A single camera of a video conferencing system may capture video images of a conference room at step 105. The single camera may be a stationary high-resolution camera with a wide angle lens, such as a fish-eye lens, in some embodiments. Also, in various embodiments, the captured video images may be gray scale video frames. Having a stationary camera may advantageously simplify the minimum requirements for the video conferencing system (i.e. by not requiring a moving camera), and may also reduce the computational complexity of the automatic framing. Likewise, using gray scale video images may also reduce computational complexity, as gray scale images may take as little as ⅓ of the memory of RGB images, saving memory bandwidth, time it takes to upload the video image to the GPU for analysis, and compute time for the feature detection described below. FIG. 2A illustrates an exemplary video image 200 captured by the camera of a video conferencing system. When using a fish-eye lens, some warping of the video image may take place, as seen in object 210 in video image 200. Accordingly, in some embodiments, the video frame may be dewarped to correct for optical distortion at step 110. The result of such dewarping may be observed in FIG. 2B, which illustrates another exemplary video image 220. After dewarping has been applied, object 225 no longer appears warped, as the optical distortion caused by the fish-eye lens of the single camera has been removed. Various dewarping algorithms may be used for the dewarping at step 110, including, but not limited to the dewarping described in J. Kannala and S. S. Brandt, "A generic camera model and calibration method for conventional, wide-angle, and fish-eye lenses," IEEE Trans. Pattern Anal. Mach. Intell., vol. 28, no. 8, pp. 1335-1340, 2006, incorporated by reference herein.

A processor of the video conferencing system may identify a potential region of interest within a video image of the captured video images, the potential region of interest including an identified participant at step 115. Using potential regions of interest to perform feature detection, rather than performing feature detection on the entire video image, may result in significant savings in computational complexity. The computational requirement of object detection including face detection is fairly demanding. Instead of running the object detector on the entire frame of the video, it is preferable to evaluate only sub-regions of the frame whenever possible. This may also allow usage of more sophisticated feature detection algorithm.

Figure 3:
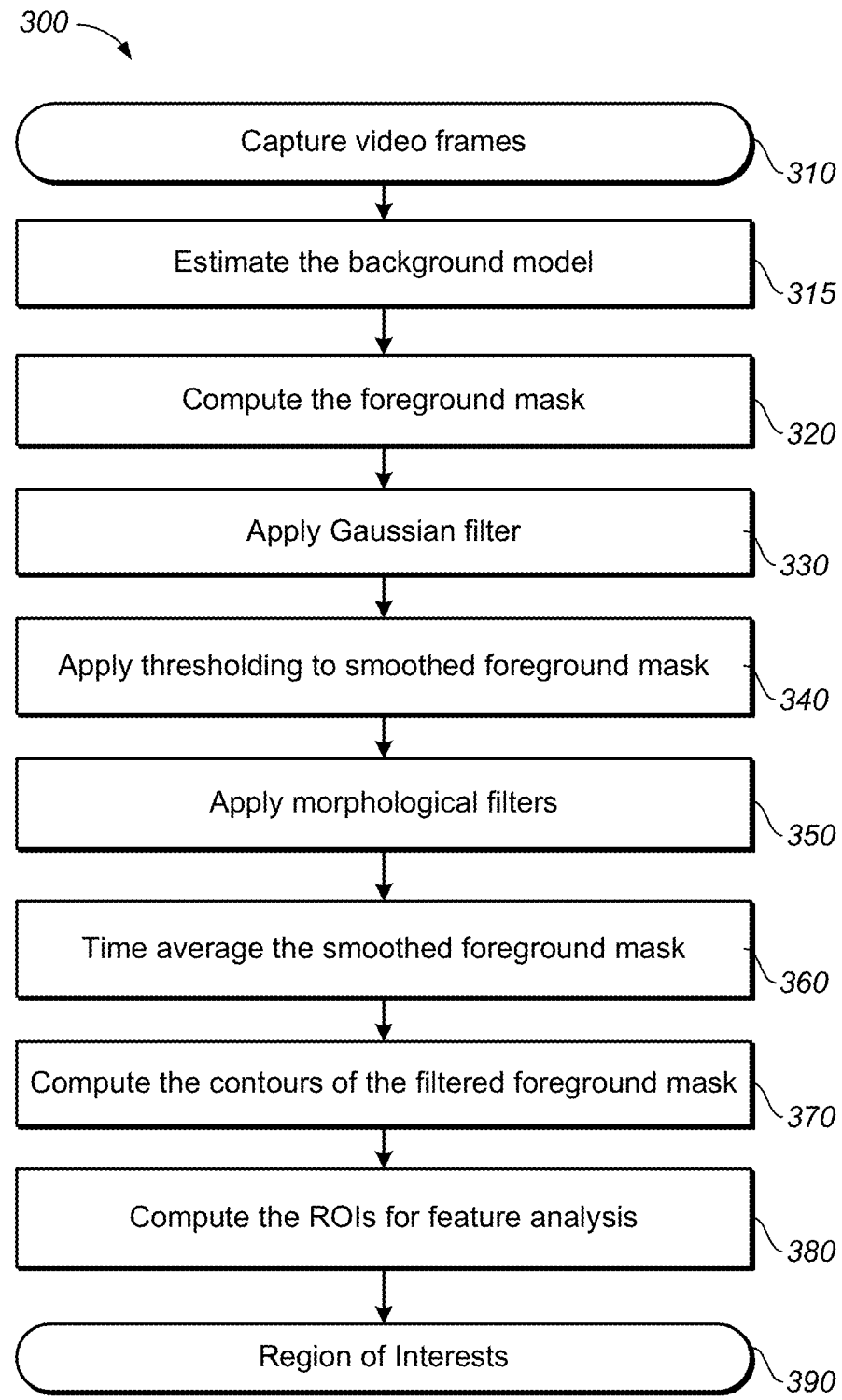
FIG. 3 shows a flow diagram for a method of computing potential regions of interest in a video image, in an embodiment.

FIG. 3 shows a flow diagram for a method 300 of computing potential regions of interest in a video image, in an embodiment. The method 300 may be based on the temporal analysis of the video provided by the stationary single camera. At step 310, video images may be captured by the camera of the video conferencing system. At step 315, a background model of the video image may be estimated. The background model can be estimated using any suitable object modeling algorithm, such as, for example, a Gaussian Mixture Model, or an AMBER-based detection algorithm. See Zivkovic, Zoran "Improved adaptive Gaussian mixture model for background subtraction", International Conference Pattern Recognition, Vol. 2, pages: 28-31, 2004, incorporated by reference herein. See also Wang, Bin and Dudek, Piotr, "A fast self-tuning background subtraction algorithm," in *Computer Vision and Pattern Recognition Workshops (CVPRW)*, 2014 *IEEE Conference on*, pages 401-404. IEEE, 2014, also incorporated by reference herein.

At step 320, a foreground mask of the video image may be computed by subtracting the estimated background model from the video image, the difference being the foreground mask of the video image. The foreground mask may then be filtered to remove noise from the foreground mask. For example, at step 330 a Gaussian filter may be applied to smooth the foreground mask across the pixels of the video image. The Gaussian filter may output a smoothed grayscale 8-bit image in some embodiments, where each pixel may be assigned a color value from 0-255. To provide further filtering, thresholding may be applied to the smoothed foreground mask at step 340. The thresholding may be applied, for example, by compare each pixel value of the captured video image to a predetermined threshold value between 1-254 or a predetermined threshold range. In an embodiment, where the threshold range for a pixel may be set to 64-192. When comparing the individual pixels to the threshold range, the pixel value of the compared pixel may be set to a value of 255 if the pixel value of the pixel falls within the threshold range, and the pixel value may be set to 0 if the pixel value is outside of the threshold range (e.g., is between 0-63 or 193-255). The comparison may be performed independently for each pixel. Also, to further filter the foreground mask, conventional morphological filters, such as erosion, which may expand dark regions of an image, and/or dilation, which may expand bright regions of an image, of the smoothed foreground mask, may be applied at step 350, to better highlight objects in the image.

At step 360, after the foreground mask has been filtered, the filtered foreground mask may be time-averaged over a plurality of video images of the captured video images to smooth the mask across time and thereby improve the estimation of the regions of interest. Using the time-averaged filtered foreground mask, a location and size of a bounding box may be calculated, the bounding box defining the potential region of interest (ROI) for the video image. That is, the ROIs for analysis are defined by the minimum boxes that include all of the contours of the time-averaged filtered foreground mask. To calculate the location and dimensions of the bounding box, contours of the time-averaged filtered foreground mask may be computed at step 370. A contour may be defined as a boundary of a detected object in an image. An example of further discussion on detecting contours may be found in Suzuki, S. and Abe, K., Topological Structural Analysis of Digitized Binary Images by Border Following. CVGIP 30 1, pp 32-46 (1985), incorporated herein by reference. Any suitable algorithm used to compute the contours in the filtered foreground mask at step 370; the invention is not limited in this regard.

The potential region of interest (ROI) defined by the bounding box may be computed at step 380 for feature analysis, with the potential ROI being the output at step 390. FIG. 2C illustrates an exemplary video image 230 that includes ROIs defined by bounding boxes. In image 230, an overall bounding box 260 includes all identified participants in the video conference. The potential region of interest bounded by box 260 may be used to frame the participants of the video conference, since all identified participants are within box 260. Each individual participant has their own corresponding bounding box 235 and 240, each defining another potential ROI. The individual participant bounding boxes 235 and 240 may be used for feature detection, such as the feature detection described by method 400 of FIG. 4. Finally, the faces of the participants are also defined by bounding boxes 245 and 250. The regions of interest within boxes 245 and 250 may be participant faces identified using the feature detection of method 400. The ROIs of the detected faces, in addition to being used in the automatic framing of participants, may also be used for updating subsequent computed regions of interest, as is discussed below. [Computing the feature detections on potential ROIs, rather than an entire video image, may have two exemplary advantages. First, for a wide field of view camera such as fish eye lens, performing feature detection on only potential ROIs is much more efficient since regions for analysis will be smaller. Second, instead of scaling the entire full view image to a lower resolution, this method will rescale a subset of the image instead of full image. This gives the ability to preserve the pixels for analysis hence more accurate detection can be achieved, especially when the user is further away from the camera.

Figure 4:
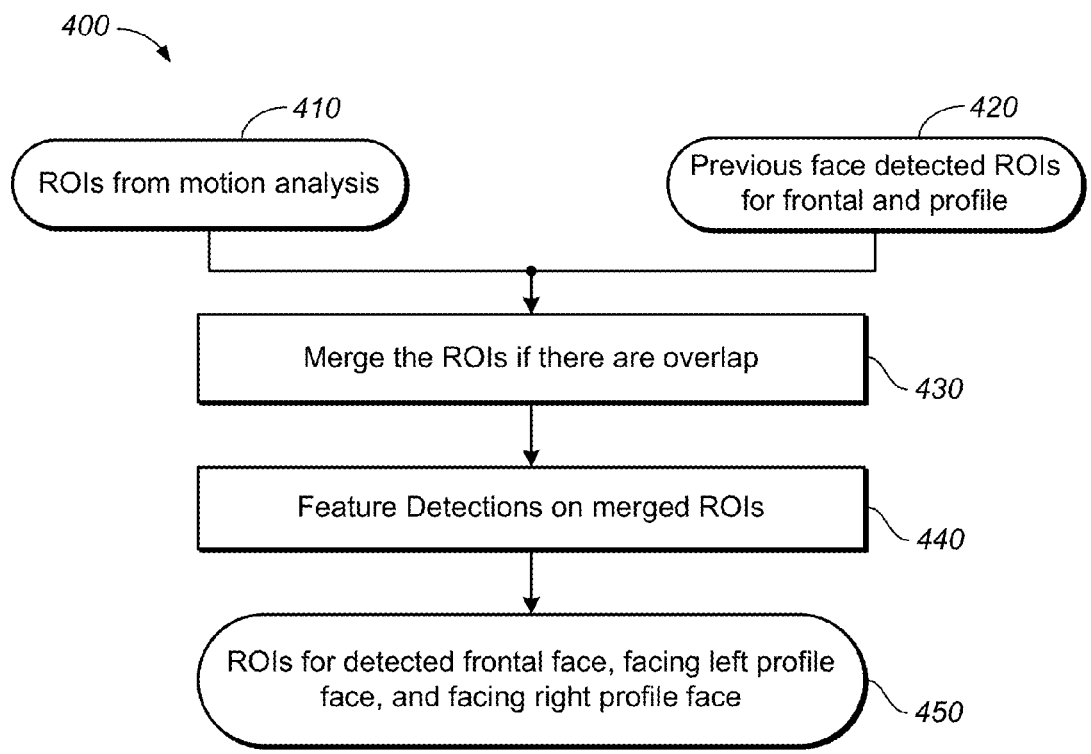
FIG. 4 shows a flow diagram for a method of applying facial recognition to computed regions of interest in a video image, in an embodiment.

Returning to FIG. 1, feature detection may be executed on the potential region of interest at step 120, and a region of interest may be computed at step 125 based on the executed feature detection. FIG. 4 shows a flow diagram for a method 400 of applying feature recognition, in the form of facial recognition, to potential regions of interest in a video image, in an embodiment. Typically the camera of the video conferencing system is mounted on either the top or bottom of a display to capture the users. During the meeting, the participants may be looking at the display, other participants or occasionally at a laptop. For this common use case, the usage for frontal face detection and profile or side view face detection may be sufficient to detect the participants which need to be included in the view for the video capture. The face detector can be any suitable feature detector, including a Haar cascade classifier, histogram of gradient (HOG) based classifier or convolutional neural network (CNN) based classifier, for example.

The regions which are needed for feature analysis are the ROIs from the motion analysis (e.g. method 300) and previously detected ROIs to validate whether the participants are still present. Accordingly, at step 430, the potential region of interest 410 within the video image (such as the potential regions of interest 390 identified by method 300) may be merged with any previous face-detected regions of interest 420 (e.g., from previous video images that have been analyzed) if there is any overlap between the potential regions of interest. At step 440, frontal face detection and profile face detection algorithms may then be applied to the merged identified regions of interest. The computed updated regions of interest 450 may each include at least one of a frontal face, left profile face, and right profile face identified by the applied algorithms.

Returning to FIG. 1, after feature detection, the determining the computed updated regions of interest at step 440 may correspond to step 125. Using the computed updated regions of interest, the video conferencing system may then automatically frame the identified participant (or participants) within the computed region of interest at step 130, by redesigning the video image to match the computed region of interest. The redesigning may include at least one of cropping the video image to match the computed region of interest and rescaling the video image to a desired resolution, thereby generating the automatically-framed video image 135. The amount of cropping and scaling may depend on the resolution of the captured video. For example, for the case of 4 k captured video when the desired resolution is 1080p, then the maximum zoom is 4 k/1920× or ~2× in order to retain the desired image resolution after resizing. The desired resolution may depend on the screen size of the playback device (i.e., a far-end video conferencing system display), as well as the playback window size. For example when playing back in full screen mode on 65 inch and 32 inch monitor, then at least 1080p and 720p resolution may be desired respectively.

Figure 2B:
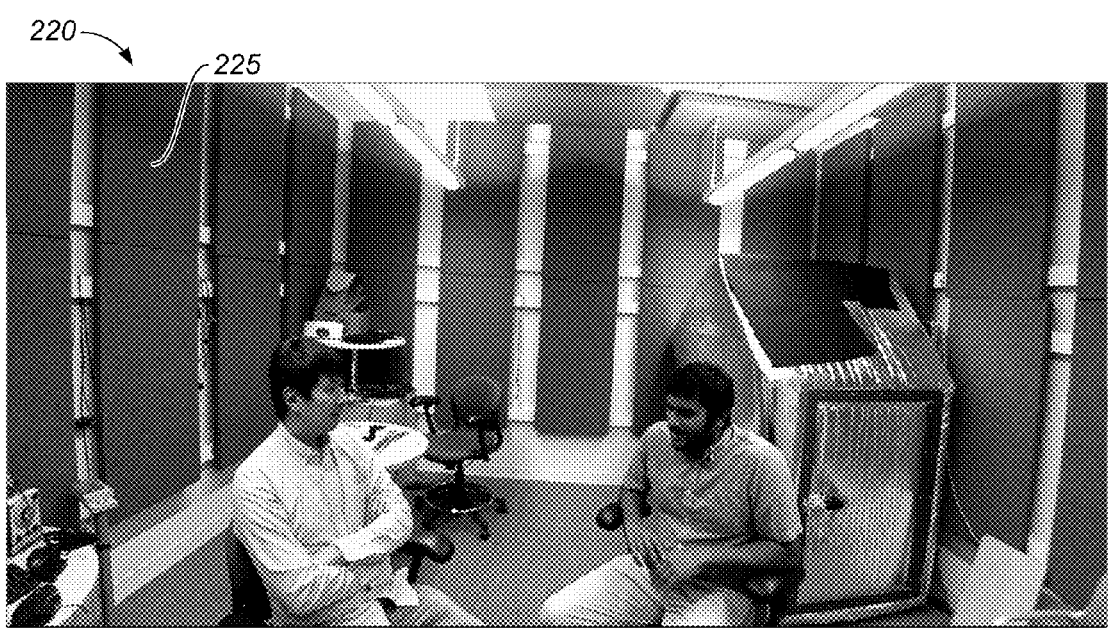
Figure 2C:
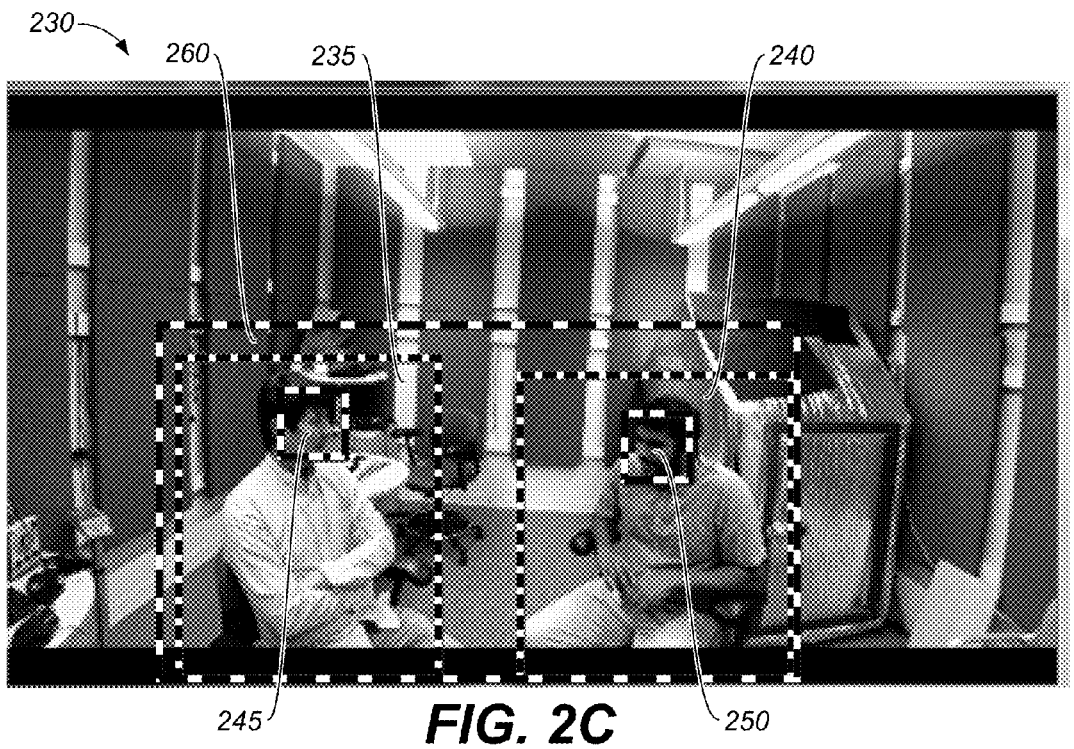
Figure 2D:

FIG. 2D illustrates an exemplary video image 270 that that has been automatically framed to include identified participants in the video conference of FIGS. 2A-C. Image 230 was cropped to match computed ROI 260 to generate automatically-framed image 270. Furthermore, the resolution of automatically-framed image 270 is set to a desired resolution, by scaling the resolution of image 230.

The computed region of interest may need to be updated in subsequent video frames. For example, the identified participants in the video conference may move, thereby rendering the regions of interest suboptimal. In an embodiment, two conditions may trigger region of interest update. First, the computed region of interest for a subsequent frame may be updated when a current computed region of interest does not include all participants. The camera may be required, in such cases, to zoom out to include new participants, or participants who have moved outside of the computed region of interest. A second update condition may be triggered when the subject of interests is close to the perimeters of the automatically-framed video image, where a different region of interest would potentially move the subject closer to the center of the shot. In such cases, automatic framing may be performed using an updated computed region of interest.

Figure 5:
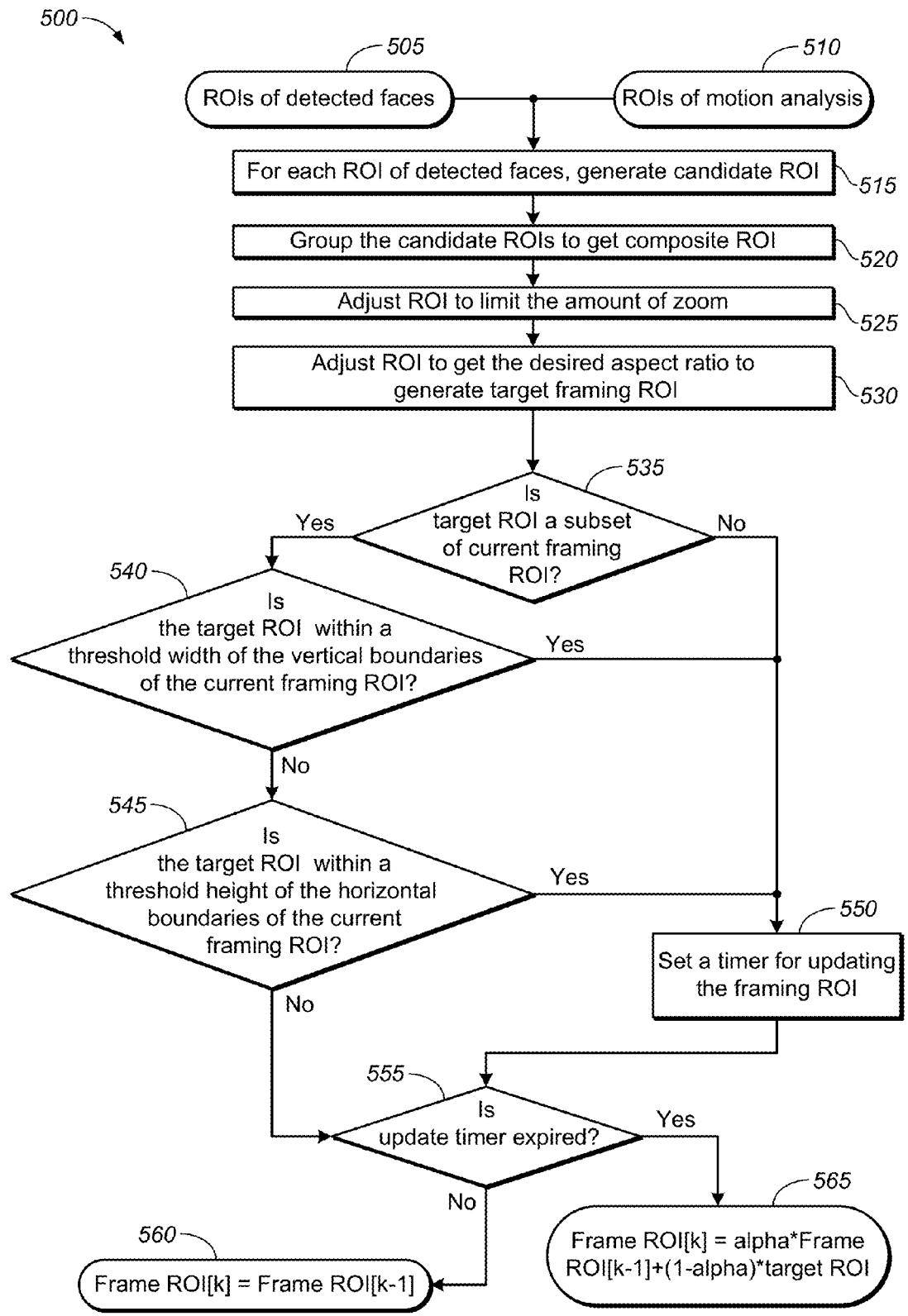
FIG. 5 shows a flow diagram for a method of updating a framed region of interest, in an embodiment.

FIG. 5 shows a flow diagram for a method 500 of updating a framed region of interest, in an embodiment, for a subsequent video image. Based on feature processing, the ROIs of detected faces 505 may be generated (e.g., ROIs defined by bounding boxes 245 and 250 of FIG. 2C). For each detected face, a candidate ROI may be generated at step 515 using the ROIs of detected faces 505 and ROIs from motion analysis 510 (e.g., potential ROIs from method 300), the candidate ROI corresponding to a potential participant in the video conference. Candidate ROIs may be seen defined by bounding boxes 235 and 240 of FIG. 2C, for example. The candidate ROIs for each participant may be grouped at step 520 to form a composite ROI (e.g., the ROI defined by bounding box 260 of FIG. 2C). The composite ROI may be adjusted based upon a maximum amount of zoom of the camera at step 525. If the maximum zoom level for the camera of the video conferencing system is 2×, for example, then the width and height of the composite ROI may be limited to have a lower bound to ½ of the width and height of the original image resolution respectively, since the camera zoom cannot effectively zoom in on a smaller composite ROI. The composite ROI may be further adjusted at step 530 to obtain a desired aspect ratio. For example, it may be desirable to preserve the aspect ratio of the captured video image, or to match the automatically-framed video image to an output display of a far-end video conferencing monitor. If the aspect ratio of the composite ROI is not the same as this desired aspect ratio, then the width or height of the composite ROI may be adjusted to match the desired aspect ratio. Table 1 below shows an example of pseudo code that may be used to maintain 16:9 aspect ratio, where the input is (topLeft and bottomRight coordinates of the bounding box of the composite ROI) and at the end of the code topLeft and bottomRight will the the coordinates of the adjusted composite ROI.

TABLE 1

Exemplary Pseudocode for Maintaining 16:9 aspect ratio

```
// Maintain 16:9 aspect ratio
center.x = (topLeft.x + bottomRight.x) >> 1;
center.y = (topLeft.y + bottomRight.y) >> 1;
xLen = bottomRight.x - topLeft.x;;
yLen = bottomRight.y - topLeft.y;
// Find the largest size (ie. width or height)
if ((float)xLen*9.f / 16.f > (float)yLen)
{
   int remainder = max(0, -center.y + (int)(0.5f*(float)xLen*9.f / 16.f));
   // Adjust the height only
   topLeft.y = max(0, center.y - (int)(0.5f*(float)xLen*9.f / 16.0);
   topLeft.y = topLeft.y - max(0, center.y + (int)(0.5f*(float)xLen*9.f / 16.0 +
remainder - motionDet.rows);
   bottomRight.y = min(motionDet.rows, center.y + (int)(0.5f*(float)xLen*9.f / 16.f)
+ remainder);
}
else
{
   int remainder = max(0, -center.x + (int)(0.5f*(float)yLen*16.f / 9.f));
   // Adjust the width only
   topLeft.x = max(0, center.x - (int)(0.5f*(float)yLen*16.f / 9.f);
   topLeft.x = topLeft.x - max(0, center.x + (int)(0.5f*(float)yLen*16.f / 9.f) +
remainder - motionDet.cols);
   bottomRight.x = min(motionDet.cols, center.x + (int)(0.5f*(float)yLen*16.f / 9.f
+ remainder);
}
```

After all adjustments have been completed, the adjusted composite ROI may be referred to as a target framing ROI.

At step 535, a determination is made to see if the target ROI is a subset of the current computed ROI used to automatically frame video images of the captured plurality of video images. If the target ROI is not a subset of the current framing ROI, the update mechanism may be triggered to update the computed ROI for the subsequent video image.

Even if the target ROI is a subset of the current computed framing ROI, the second condition discussed above must be met in order for the same automatic framing to be used for the subsequent video frame, in an exemplary embodiment. Accordingly, at step 540, a determination is made whether or not the target ROI is within a threshold width of the vertical boundaries of the current framing ROI. Mathematically, this may be expressed by the conditional:

Max(Abs(FrameROI[k-1].topLeft.x-targetROI.bottomRight.x),Abs(FrameROI[k-1].bottomRight.x-targetROI.bottomRight.x)) >ThreshWidth*targetROI.width.

If the condition is met, then the target ROI is near a horizontal edge of the current framing ROI, and the update mechanism may be triggered. If not, then at step 545 a similar inquiry is made, determining whether or not the target ROI is within a threshold height of the horizontal boundaries of the current framing ROI. Mathematically, this may be expressed by the condition:

Max(Abs(FrameROI[k-1].topLeft.y-targetROI.bottomRight.y),Abs(FrameROI[k-1].bottomRight.y-targetROI.bottomRight.y)) >ThreshHeight*targetROI.height If the condition is met, then the target ROI is near a vertical edge of the current framing ROI, and the update mechanism may be triggered. If the condition is not met, then the current framing ROI is adequate for the subsequent video frame, and is not changed. Block 560 illustrates an expression for when the current framing ROI is used for the subsequent video frame at time k.

An exemplary update mechanism for the computed ROI is shown in method 500. At step 550, a timer is set for updating the computed region of interest. When the timer expires at step 555, the computed region of interest may be modified based on the target region of interest. An exemplary formula for modifying the computed region of interest is shown in block 565. Alpha may be a predetermined constant defining the rate of change of the computed ROI to match the target ROI. When alpha is small, the change to match the target ROI may be more gradual, allowing a less jarring transition for viewers at the far end of the video conference. A larger alpha may lead to larger jumps in the framing of the identified participants; however, this may be desirable in specific instances.

Figure 6:
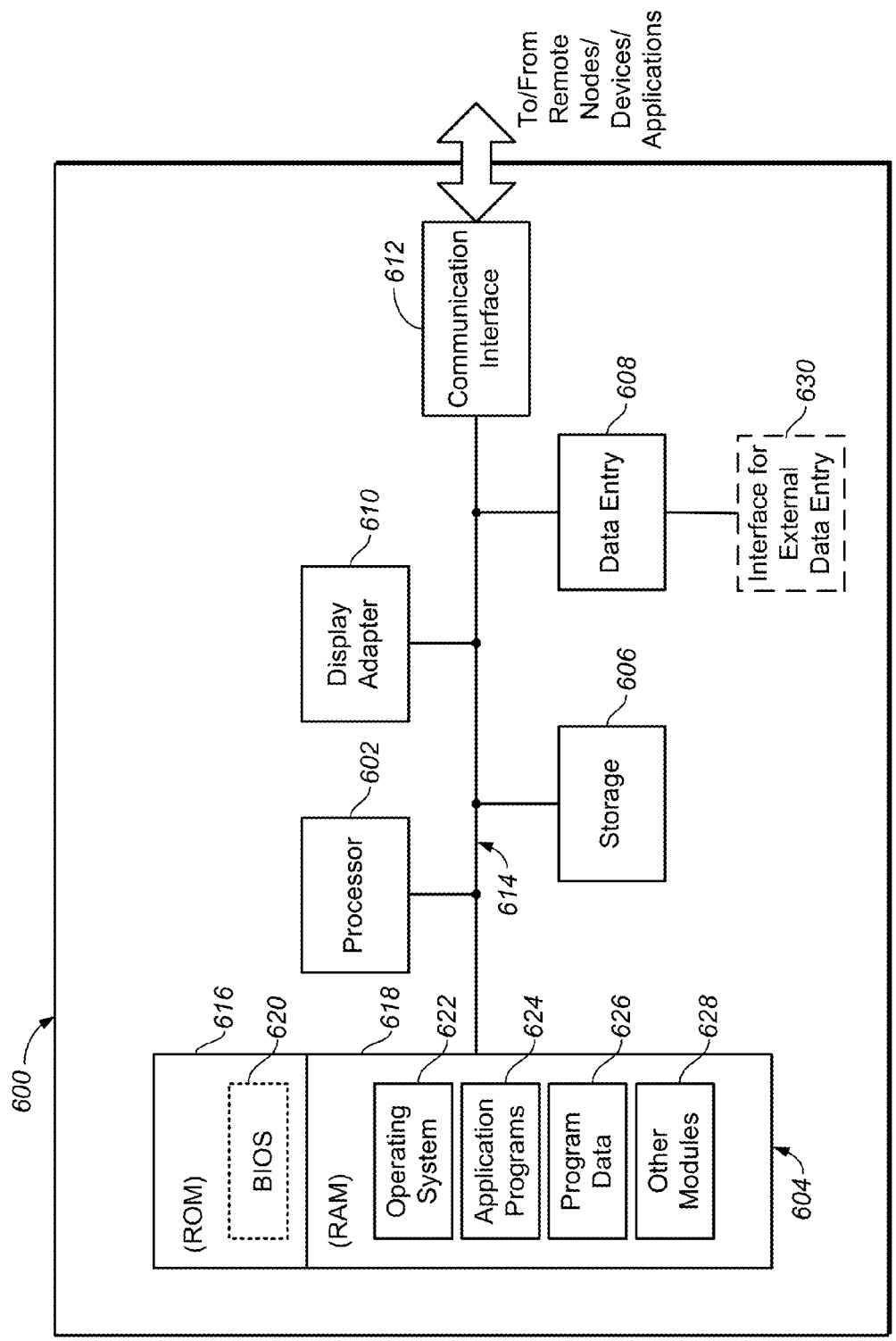
FIG. 6 is a block diagram of an exemplary system for automatically framing participants in a video conference, in an embodiment.

FIG. 6 is a block diagram of an exemplary system for modifying far-end signal playback on an audio device, in various embodiments. With reference to FIG. 6, an example system for implementing the subject matter disclosed herein, including the methods described above, includes a hardware device 600, including a processing unit 602, memory 604, storage 606, data entry module 608, display adapter 610, communication interface 612, and a bus 614 that couples elements 604-612 to the processing unit 602.

The bus 614 may comprise any type of bus architecture. Examples include a memory bus, a peripheral bus, a local bus, etc. The processing unit 602 is an instruction execution machine, apparatus, or device and may comprise a microprocessor, a digital signal processor, a graphics processing unit, an application specific integrated circuit (ASIC), a field programmable gate array (FPGA), etc. The processing unit 602 may be configured to execute program instructions stored in memory 604 and/or storage 606 and/or received via data entry module 608.

The memory 604 may include read only memory (ROM) 616 and random access memory (RAM) 618. Memory 604 may be configured to store program instructions and data during operation of device 600. In various embodiments, memory 604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 604 may also include nonvolatile memory technologies such as non-volatile flash RAM (NVRAM) or ROM. In some embodiments, it is contemplated that memory 604 may include a combination of technologies such as the foregoing, as well as other technologies not specifically mentioned. When the subject matter is implemented in a computer system, a basic input/output system (BIOS) 620, containing the basic routines that help to transfer information between elements within the computer system, such as during start-up, is stored in ROM 616.

The storage 606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 600.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 606, ROM 616 or RAM 618, including an operating system 622, one or more applications programs 624, program data 626, and other program modules 628. A user may enter commands and information into the hardware device 600 through data entry module 608. Data entry module 608 may include mechanisms such as a keyboard, a touch screen, a pointing device, etc. Other external input devices (not shown) are connected to the hardware device 600 via external data entry interface 630. By way of example and not limitation, external input devices may include a microphone, joystick, game pad, satellite dish, scanner, or the like. In some embodiments, external input devices may include video or audio input devices such as a video camera, a still camera, etc. Data entry module 608 may be configured to receive input from one or more users of device 600 and to deliver such input to processing unit 602 and/or memory 604 via bus 614.

The hardware device 600 may operate in a networked environment using logical connections to one or more remote nodes (not shown) via communication interface 612. The remote node may be another computer, a server, a router, a peer device or other common network node, and typically includes many or all of the elements described above relative to the hardware device 600. The communication interface 612 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 612 may include logic configured to support direct memory access (DMA) transfers between memory 604 and other devices.

In a networked environment, program modules depicted relative to the hardware device 600, or portions thereof, may be stored in a remote storage device, such as, for example, on a server. It will be appreciated that other hardware and/or software to establish a communications link between the hardware device 600 and other devices may be used.

It should be understood that the arrangement of hardware device 600 illustrated in FIG. 6 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 600. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 6. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method for automatically framing participants in a video conference using a single camera of a video conferencing system, the method comprising:
   capturing, by the camera, video images of a conference room;
   identifying, by a processor of the video conferencing system, a potential region of interest within a video image of the captured video images, the potential region of interest including an identified participant, the identifying comprising:
   estimating a background model of the video image;
   subtracting the estimated background model from the video image, the difference being a foreground mask of the video image;
   time averaging the foreground mask over a plurality of video images of the captured video images; and
   calculating a location and size of a bounding box defining the potential region of interest for the video image, the bounding box enclosing a plurality of contours within the time-averaged foreground mask;
   executing, by the processor, feature detection on the potential region of interest defined by the calculated bounding box;
   computing, by the processor, a region of interest based on the executed feature detection; and
   automatically framing, by the processor, the identified participant within the computed region of interest, the automatic framing comprising at least one of cropping the video image to match the computed region of interest and resealing the video image to a desired resolution.

2. The method of claim 1, the identifying the potential region of interest further comprising:
   filtering the foreground mask to remove noise from the foreground mask, the filtering taking place prior to the time averaging the foreground mask over the plurality of video images.

3. The method of claim 2, the filtering the foreground mask comprising:
   applying a Gaussian filter to the foreground mask;
   applying thresholding to the foreground mask after the Gaussian filter is applied; and
   applying morphological filters to remove noise from the foreground mask after the thresholding is applied, resulting in a filtered foreground mask.

4. The method of claim 3, the morphological filters comprising at least one of eroding and dilating the foreground mask.

5. The method of claim 1, the desired resolution being lower than a resolution of the video image when captured by the camera.

6. The method of claim 1, the executing feature detection comprising:
   merging the potential region of interest within the video image with any previous face-detected regions of interest;
   applying frontal face detection and profile face detection algorithms to the merged identified regions of interest, the computed updated regions of interest each including at least one of a frontal face, left profile face, and right profile face identified by the applied algorithms.

7. The method of claim 1, further comprising:
   identifying a plurality of potential regions of interest in a subsequent video image of the captured video images;
   merging the potential regions of interest in the subsequent video image to generate a composite region of interest;
   adjusting the composite region of interest to limit an amount of zoom and a desired aspect ratio to generate a target region of interest; and
   updating the computed region of interest for the subsequent video image when the target region of interest is not a subset of the computed region of interest.

8. The method of claim 7, further comprising updating the computed region of interest for the subsequent video image when the target region of interest is within at least one of a predetermined height and a predetermined width from an edge of the computed region of interest.

9. The method of claim 7, the updating comprising:
setting a timer for updating the computed region of interest; and
when the timer expires, modifying the computed region of interest based on the target region of interest.

10. A video conferencing system comprising:
a single camera that captures video images of a room in which the video conferencing system is broadcasting and receiving video conference data from; and
an audio controller communicatively coupled to the camera, the audio controller comprising a processor configured to:
identify a potential region of interest within a video image of the captured video images, the potential region of interest including an identified participant, the identifying comprising:
estimating a background model of the video image;
subtracting the estimated background model from the video image, the difference being a foreground mask of the video image;
time averaging the foreground mask over a plurality of video images of the captured video images; and
calculating a location and size of a bounding box defining the potential region of interest for the video image, the bounding box enclosing a plurality of contours within the time-averaged foreground mask;
execute feature detection on the potential region of interest;
compute a region of interest based on the executed feature detection; and
automatically frame the identified participant within the computed region of interest, the automatic framing comprising at least one of cropping the video image to match the computed region of interest and rescaling the to a desired resolution.

11. The video conferencing system of claim 10, the single camera being a camera with a fish-eye lens.

12. The video conferencing system of claim 10, the audio controller identifying the potential region of interest by:
filtering the foreground mask to remove noise from the foreground mask, the filtering taking place prior to the time averaging the foreground mask over the plurality of video images.

13. The video conferencing system of claim 12, the audio controller filtering the foreground mask by:
applying a Gaussian filter to the foreground mask;
applying thresholding to the foreground mask after the Gaussian filter is applied; and
applying morphological filters to remove noise from the foreground mask after the thresholding is applied, resulting in a filtered foreground mask.

14. The video conferencing system of claim 13, the morphological filters comprising at least one of eroding and dilating the foreground mask.

15. The video conferencing system of claim 10, the desired resolution being lower than a resolution of the video image when captured by the camera.

16. The video conferencing system of claim 10, audio controller executing feature detection by:
merging the potential region of interest within the video image with any previous face-detected regions of interest;
applying frontal face detection and profile face detection algorithms to the merged identified regions of interest, the computed updated regions of interest each including at least one of a frontal face, left profile face, and right profile face identified by the applied algorithms.

17. The video conferencing system of claim 10, the audio controller processor being further configured to:
identify a plurality of potential regions of interest in a subsequent video image of the captured video images;
merge the potential regions of interest in the subsequent video image to generate a composite region of interest;
adjust the composite region of interest to limit an amount of zoom and a desired aspect ratio to generate a target region of interest; and
update the computed region of interest for the subsequent video image when the target region of interest is not a subset of the computed region of interest.

18. The video conferencing system of claim 17, the processor being further configured to update the computed region of interest for the subsequent video image when the target region of interest is within at least one of a predetermined height and a predetermined width from an edge of the computed region of interest.

19. The video conferencing system of claim 17, the audio controller updating the computed region of interest for the subsequent video image by:
setting a timer for updating the computed region of interest; and
when the timer expires, modifying the computed region of interest based on the target region of interest.

20. A computer program product comprising computer-readable program code to be executed by one or more processors when retrieved from a non-transitory computer-readable medium, the program code including instructions to:
identify a potential region of interest within a video image of the captured video images, the potential region of interest including an identified participant, the identifying comprising:
estimating a background model of the video image;
subtracting the estimated background model from the video image, the difference being a foreground mask of the video image;
time averaging the foreground mask over a plurality of video images of the captured video images; and
calculating a location and size of a bounding box defining the potential region of interest for the video image, the bounding box enclosing a plurality of contours within the time-averaged foreground mask;
execute feature detection on the potential region of interest;
compute a region of interest based on the executed feature detection; and
automatically frame the identified participant within the computed region of interest, the automatic framing comprising at least one of cropping the video image to match the computed region of interest and rescaling the to a desired resolution.

* * * * *